May 15, 1962 J. C. WILCOX 3,034,396
OPTICAL INSPECTION APPARATUS
Filed Oct. 22, 1957 2 Sheets-Sheet 1
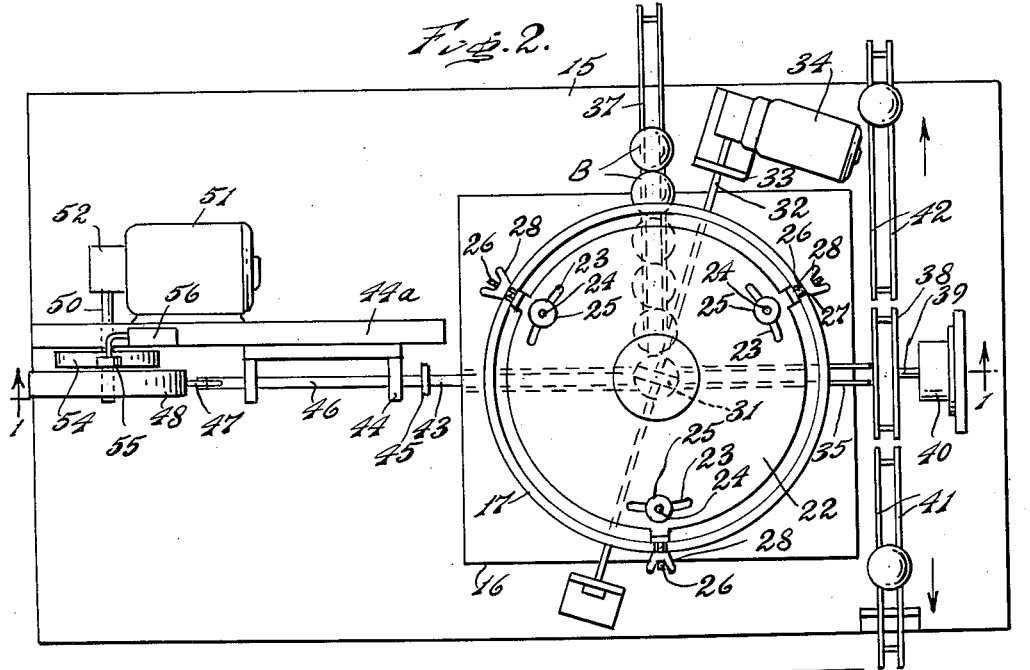
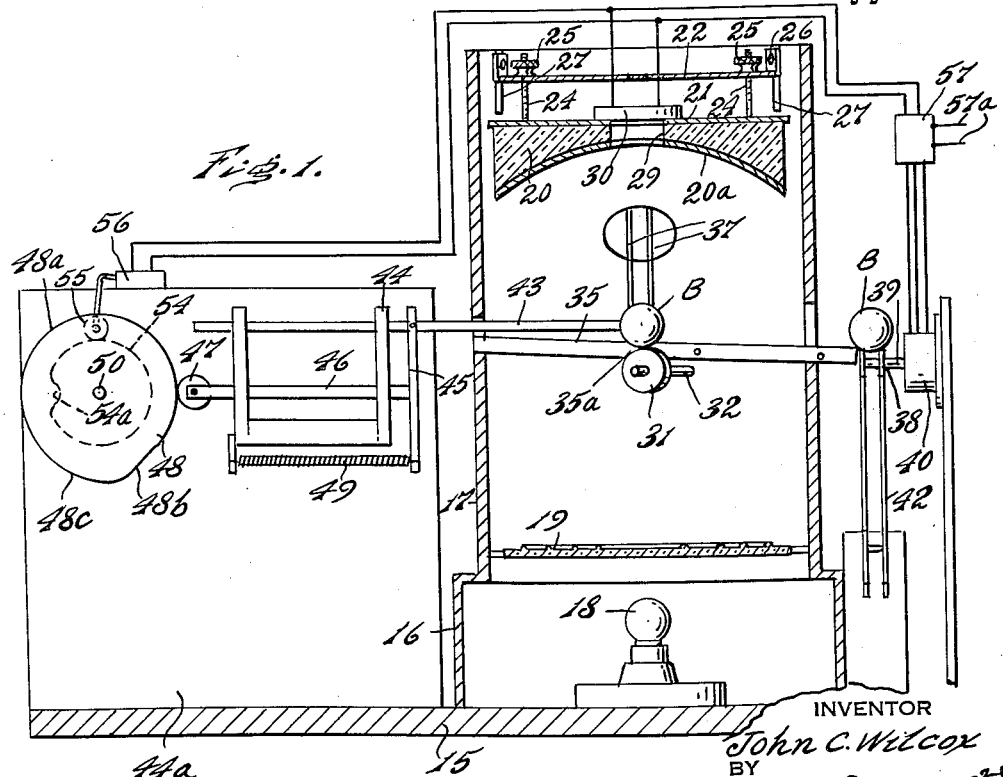
INVENTOR
John C. Wilcox
BY
B. T. Wobensmith
ATTORNEY

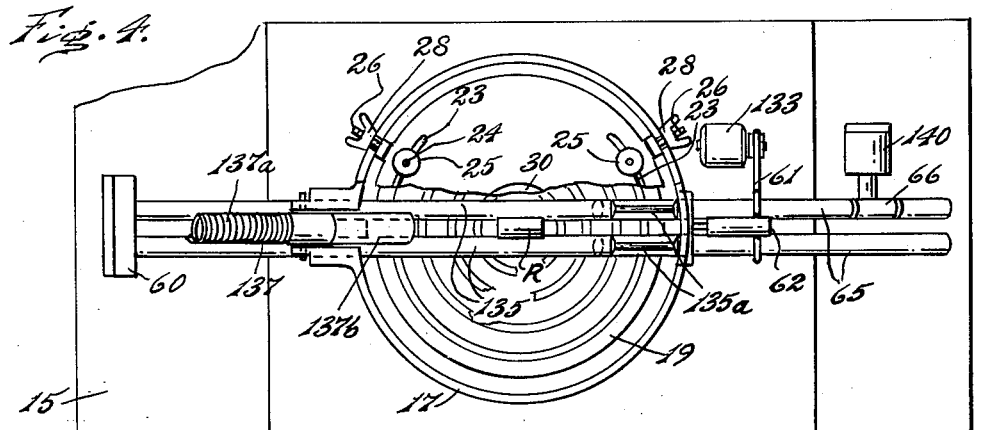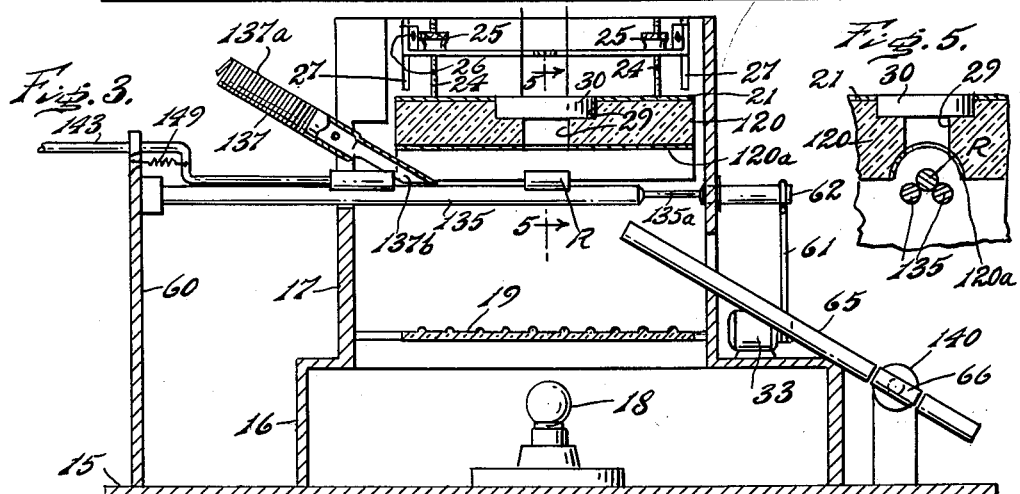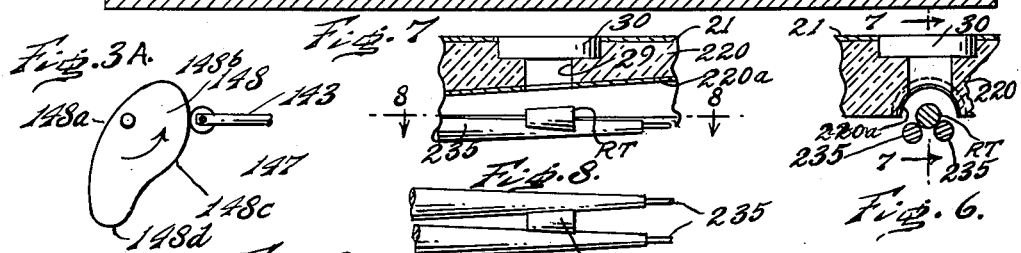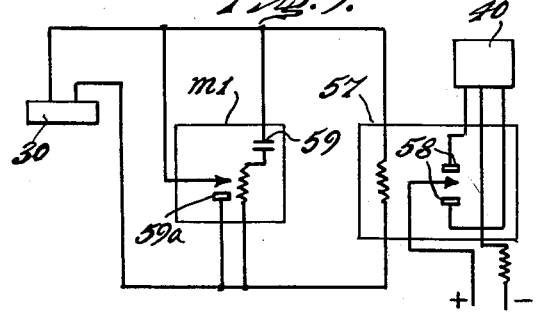
INVENTOR
John C. Wilcox
BY
ATTORNEY

United States Patent Office 3,034,396
Patented May 15, 1962

3,034,396
OPTICAL INSPECTION APPARATUS
John C. Wilcox, Springfield, Pa. (% P. A. Patterson Co. Inc., 3133 N. Broad St., Philadelphia 32, Pa.)
Filed Oct. 22, 1957, Ser. No. 691,753
14 Claims. (Cl. 88—14)

This invention relates to inspection apparatus for balls, cylindrical and tapered rollers and the like, and more particularly to such apparatus for optically utilizing the light reflective characteristics of the geometric surfaces of such articles for purposes of inspection and/or selection.

It has been heretofore proposed to focus a point of light on an article to be inspected but such an arrangement is time consuming in use because of the relation of the area of the light beam to the area to be inspected.

It is the principal object of the present invention to provide inspection apparatus for optically utilizing the light reflective characteristics of the geometric surfaces of balls, rollers and the like, and particularly such articles which are to serve as bearings and the like, so that objectionable characteristics including waviness, nicks, scratches, flats, cracks, discoloration, stains, rust, corrosion, and the like, can be readily detected.

It is a further object of the present invention to provide, in inspection apparatus of the character aforesaid, a simple and highly effective optical system of improved type.

It is a further object of the present invention to provide inspection apparatus of the character aforesaid which is easy to use by unskilled persons, is compact, and which has a high order of reliability.

It is a further object of the present invention to provide inspection apparatus for optically utilizing the light reflective properties of the geometric surfaces of balls, rollers and the like, and with which selecting and rejecting devices can be readily employed.

Other objects and advantageous features of the invention will be apparent from the description and claims.

The nature and characteristic features of the invention will be more readily understood from the following description, taken in connection with the accompanying drawings forming part thereof, in which:

FIGURE 1 is a vertical sectional view taken approximately on the line 1—1 of FIG. 2 and showing a preferred embodiment of the invention for the inspection of spherical articles;

FIG. 2 is a top plan view of the apparatus shown in FIG. 1;

FIG. 3 is a vertical sectional view similar to FIG. 1 and showing a preferred embodiment of the invention for the inspection of cylindrical objects;

FIG. 3A is a side elevational view of a cam suitable for use with the apparatus shown in FIG. 3;

FIG. 4 is a top plan view of the apparatus shown in FIG. 3, parts being broken away to show the details of construction;

FIG. 5 is a vertical sectional view, enlarged, taken approximately on the line 5—5 of FIG. 3;

FIG. 6 is a view similar to FIG. 5 showing a modified form of reflector for use with the apparatus shown in FIGS. 3, 4, and 5;

FIG. 7 is a fragmentary vertical sectional view taken approximately on the line 7—7 of FIG. 6;

FIG. 8 is a fragmentary horizontal sectional view taken approximately on the line 8—8 of FIG. 7; and FIG. 9 is a diagrammatic view of an alternative form of control circuit for controlling the acceptance and rejection of articles inspected.

It should, of course, be understood that the description and drawings herein are illustrative merely, and that various modifications and changes can be made in the structure disclosed without departing from the spirit of the invention.

Like numerals refer to like parts throughout the several views.

In accordance with the present invention, rays of light from a light source are directed in parallel relation to and reflected from a concave mirror, curved in at least one direction, onto a substantial portion of the surface of an article to be inspected, the mirror being of substantially similar geometric shape to that of the surface to be inspected but of larger size. The quantity of light reflected from the surface to be inspected can then be measured, and provides a basis for comparison with a predetermined standard previously ascertained for acceptable surface reflections. The quantity of light thus measured can be utilized for controlling the acceptance or rejection of the articles inspected.

Referring now more particularly to FIGS. 1 and 2 of the drawings, the apparatus there shown is particularly suitable for the inspection of the surfaces of spherical objects.

A base 15 is provided having a lower housing 16 mounted thereon from which an upper housing 17 extends upwardly.

Within the lower housing 16, a light source 18, such as an incandescent lamp, is provided. The light source can be suitably controlled, if desired, so as to be adjustable, and so as to be free from fluctuations due to changes in its source of energy.

Above the light source 18, and within the housing 17, a collimating lens 19, such as a Fresnel lens, is provided, and horizontally disposed, for directing the light rays in a parallel cylindrical path upwardly within the housing 17.

At the upper end of the housing 17, a concave mirror 20 is provided and mounted on a supporting plate 21. While any suitable type of mirror 20 can be employed it is preferred to utilize a mirror of the type known as a first surface mirror.

The mirror 20, for the inspection of spherical surfaces, preferably has a hollow spherical surface 20a with a focus at or near the center of the spherical article, such as a spherical ball B, to be inspected when that article is at its proper station or location for inspection. The plate 21 is adjustably supported by a bracket plate 22 which has a plurality of arcuate slots 23 through which threaded rods 24 extend.

The rods 24 are secured to the plate 21 and are provided with knurled thumb nuts 25 for centering and tilting the mirror 20 for adjustment of the position thereof.

The bracket plate 22 has a plurality of threaded studs 26 extending therefrom and through vertical slots 27 in the upper housing 17, nuts 28 on the outer ends of the studs 26 permitting of vertical adjustment of the bracket plate 22 and thereby of the mirror 20.

The mirror 20 is provided with a central opening 29 of predetermined diameter through the spherical reflecting surface 20a thereof. The diameter of the opening 29 is preferably greater than that of the article to be inspected. Above the opening 29, and carried by the plate 21, a light sensitive element 30 is provided which is responsive to the quantity or intensity of the light delivered thereto through the opening 29. The light sensitive element 30 can be a barrier layer self energizing cell, or photoelectric cell.

Intermediate the surface 20a and the lens 19 and at a location below the focus of the mirror 20, a movable support is provided which preferably consists of a disc 31 for contact with the bottom of the article so that upon rotation of the disc 31 the upper surface of the article is continuously shifted. The disc 31 is mounted on a shaft 32, which is supported in upright brackets 33 secured to the base 15. The shaft 32 is driven at a predetermined speed of rotation by a driving motor 34.

A supporting trackway 35 is provided, preferably having spaced parallel rails with a longitudinally disposed portion 35a at the center of the housing 17 which provides an inspection station and with a slightly downward inclination therefrom to the exterior of the housing 17 for the delivery of the articles after inspection.

A supply trackway 37 extends from the exterior of the housing 17 to the portion 35a for the delivery of articles to be inspected to that location. A vibratory or other hopper (not shown) can be connected to the trackway 37 for continuously supplying articles to be inspected.

At the outer end of the trackway 35, a tiltable track section 38 is provided for receiving the articles delivered thereto by the trackway 35. The track section 38 is carried by a shaft 39 which is positioned by a rotary or oscillating solenoid 40. The solenoid 40 preferably has a pair of opposed windings for movement of the shaft 39 in opposite directions.

At the opposite ends of the track section 38, track sections 41 and 42 are provided extending therefrom for receiving articles delivered thereto upon the respective tilting forwardly or rearwardly of the track section 38. One of the track sections, such as the track section 41, can serve as an "accept" section and the other, such as the track section 42, can serve as a "reject" section.

In order to advance articles delivered to the inspection station, upon the completion of the inspection, from the portion 35a an actuator rod 43 is provided having its inner end for engagement with the article. The rod 43 is slidably mounted in a frame 44 carried by an upright 44a secured to the base 15. The rod 43 is secured to an actuator plate 45 to which a cam follower rod 46 is also secured. The follower rod 46 is also slidably mounted in the frame 44 and has a cam follower 47 thereon which is held in engagement with an ejector cam 48 by a spring 49 secured to the actuator plate 45 and to the frame 44.

The cam 48 is preferably provided over more than one half of its periphery with a dwell portion 48a so that the rod 43 is in retracted position, and over more than one quarter of the periphery with a rising portion 48b for impelling the rod 43 to a position to dislodge the article from the portion 35a for delivery for selection, and a return portion 48c for permitting the return of the rod 43 to retracted position by the spring 49.

The ejector cam 48 is secured to a shaft 50 which is rotatably supported by the upright 44a. The shaft 50 is driven by a motor 51, mounted on the upright 44a, through a speed reducer 52.

The shaft 50 also can have mounted thereon for rotation thereby a gaging cam 54 which has a depression 54a thereon for actuation of a follower 55 connected to a micro-switch 56.

The light sensitive element 30, as shown in FIG. 1, is connected to a relay 57 for energization thereof. The relay 57 has circuit input connections 57a and is preferably of a type having a pair of reverse polarity contacts and a deenergized or out of contact position. The out of contact position can be utilized during a non-measuring portion of the cycle, one of the contacts being energized at a lower level of energization of the relay 57 for "reject" actuation and the other of the contacts being energized at a higher level of energization of the relay 57 for "accept" actuation. The contacts of the relay 57 are connected to the solenoid 40 for energization thereof to either the "reject" position or the "accept" position. The micro-switch 56, shunted across the light sensitive element 30, provides a zeroizing action after an article has been discharged by the track section 38.

In the circuit shown in FIG. 9, the light sensitive element 30 is connected to a meter-relay 57, responsive in the range from 0 to 50 microamperes, and which has contacts 58 connected to the solenoid 40. An additional adjustable meter M1 is provided, shunted across the light sensitive element 30 and having a capacitance 59 and an adjustable contact 59a, responsive in the range from about 0 to 1 or 2 microamperes, for discharging the capacitance upon energization of the contact 59a and modifying the action of the response of the meter-relay 57.

Referring now more particularly to FIGS. 3, 3A, 4 and 5 of the drawings, the apparatus there shown is particularly suitable for the inspection of the peripheral surfaces of elongated articles such as cylinders or cylindrical rollers.

At the upper end of the housing 17, a concave mirror 120 is provided mounted on a supporting plate 21, adjustably mounted as previously explained.

While any suitable type of mirror 120 can be employed, it is preferred to use a mirror of the type known as a first surface mirror and for the inspection of cylindrical surfaces preferably has a downwardly disposed hollow cylindrical reflecting surface 120a with the longitudnal axis of the focus at or near and parallel to the longitudinal axis of the cylindrical object such as a roller R, to be inspected when that article is at its proper station or location for inspection.

The mirror 120 is provided with a central opening 29 of predetermined diameter through the cylindrical reflecting surface 120a. The diameter of the opening 29 is preferably greater than the diameter of the cylindrical article to be inspected. Above the opening 29, and carried by the plate 17, a light sensitive element 30 is provided, as previously explained.

Intermediate the surface 120a and the lens 19 and at a location below the focus of the mirror 120, a movable support is provided which preferably consists of spaced parallel rails or rods 135 for supporting contact with the bottom of the article R so that upon rotation of the rods 135 the upper surface of the article R is continuously shifted. The rods 135 are journalled in the housing 17 and in an upright bracket 60 secured to the base 15. The rods 135 are driven in the same direction, by a belt 61 passing under an idler 62, and at a predetermined speed of rotation, by a driving motor 133.

The rods 135 serve as a supporting trackway with an inspection station at the central portion thereof within the housing 17 and have portions 135a of reduced diameter for the delivery of each of the articles R after inspection.

A supply conduit 137, connected to a vibratory hopper (not shown), extends from the exterior of the housing 17 to the portion of the rods 135 spaced from the inspection location for the delivery of articles to be inspection to that location. The supply conduit 137 can include a coil spring 137a with a flexibly or hingedly mounted spout 137b open at the bottom supplying articles R to be inspected.

Below the reduced diameter portions 135a of the rods 135, a chute 65 having spaced rails is provided for receiving the articles delivered thereto from the rods 135. The chute 65 is provided with a side rail section 66 positioned by a rotary or oscillating solenoid 140 which is similar in action to the solenoid 40. The solenoid 140 preferably has a pair of opposed windings for movement of the rail section 66 to a position in or out of alignment with the contiguous rail.

The respective positions of the rail section 66 in alignment provide an "accept" position and the other, out of alignment, can serve as a "reject" position.

In order to advance articles from the supply conduit 137 to the inspection location, and subsequently advance the articles for discharge at the rod portions 35a upon the completion of the inspection, an impeller rod 143 is provided having its inner end for engagement with an article. The rod 143 is slidably mounted in the upright 60 and is actuated by a cam follower 147 (see FIG. 3A). The cam follower 147 is held in engagement with a cam 148 (see FIG. 3A) by a spring 149.

The cam 148 is preferably provided on its periphery with a portion 148a so that the rod 143 is retracted to a position where an article R can be delivered from the spout 137b onto the rods 135, and a rising portion 148b for impelling the rod 143 to a position to move the article R to the inspection location, the spout 137b yielding upwardly to permit the article R to be moved therebeyond. At this and other positions of the impeller rod 143 and except when completely retracted the rod 143 prevents another article from being delivered from the spout 137b to the rods 135. The cam 148 is also provided with a dwell portion 148c for permitting the article to remain at the central position for inspection, and a rising ejector portion 148d for advancing the article for discharge at the portions 135a of the rods 135.

The light sensitive element 30 as shown in FIGS. 1 or 9 is connected to a relay 57 for energization thereof and control of the solenoid 140.

Referring now more particularly to FIGS. 6, 7, and 8, which show a modification of the structure of FIGS. 3 to 5, a mirror 220 as there shown, is provided for the inspection of tapered cylindrical articles and preferably has a hollow frusto-conical reflecting surface 220a with its focus at or near the center of the tapered article RT to be inspected when that article is at its proper station or location for inspection.

The rotatable supporting rods 235 which serve as a supporting trackway, similar to the rods 135, are preferably tapered so that the tapered article RT supported thereon is maintained in a horizontal position during its rotation at the inspection location. The taper of the rods 235 is such as to permit turning of the article RT on its horizontally disposed longitudinal axis without any tendency to cause the article to move or creep along its longitudinal axis.

The mode of operation will now be pointed out.

Light from the light source 18 is delivered upwardly through the lens 19 and onto the reflecting surface 20a, 120a or 220a, and downwardly onto an article B, R or RT, supported at the inspection location by the fixed rails 35 or the rotating rails 135 or 235. If the article is a spherical article B, supported by the fixed rails 35, it is continuously rotated by the disc 31.

The article B, R or RT, supported as described, is continuously shifted so that a different face portion is continuously presented to the light rays reflected from the mirror surface 20a, 120a, or 220a, and the illuminated surface of the article B, R or RT, in turn, reflects light which is delivered in a quantity dependent upon the reflecting characteristic of the surface of the article through the aperture 29 to the light sensitive element 30.

It has been ascertained that waviness, nicks, scratches, flats, cracks, discolorations, stains, corrosion, rust, and the like, determine the quantity of light delivered to the light sensitive element 30, that the quantity of light delivered will vary with variations in the surface of the article so that this can serve as a measure of the condition of the surface of the article.

It has also been ascertained that a standard delivered quantity of light, as measured by the light sensitive element 30 can be used as a reference, and that if the quantity of light delivered remains either at a particular level or within a predetermined range this measurement is indicative of the acceptability of the article, while if the light falls below or above a predetermined level or range, this is indicative that the article is unsatisfactory and should be rejected.

The quantity of light, as measured by the light sensitive element 30, is effective directly, as shown in FIGS. 1 and 4, for actuating the solenoid 40 or 140 to an "accept" or "reject" position for the articles successively inspected.

For some articles it has also been ascertained that a variation or fluctuation from a predetermined level of light measurement is indicative of a defect, and the circuit illustrated in FIG. 9 is particularly suitable for articles of this type.

The meter M1 in response to a predetermined fluctuation, as determined by its setting, causes the contacts 59a to close and discharge the capacitance 59 and cause an impulse of sufficient magnitude to actuate the meter relay 57 for giving a reject impulse to the solenoid 40.

The articles for successive inspection are delivered as shown in FIGS. 1 and 2 from the supply trackway 37 by the timed actuation of the rod 43, or as shown in FIGS. 3 and 4 are delivered by the timed movement of the rod 143 from the supply conduit 137 to the inspection location and upon the completion of the inspection to the rod portions 135a for discharge.

I claim:

1. Inspection apparataus for an article having a predetermined geometrical surface with a center of curvature comprising a housing having a light source therein, a mirror carried by said housing for receiving the light from said source, said mirror having a corresponding interior geometrical surface of larger radius of curvature than said article surface, a collimating device in said housing interposed between said mirror and said source for directing light rays from said source to said mirror, a support for an article in said housing interposed between said collimating device and said mirror, said mirror and said support being relatively located to support the article with a center of curvature of said article substantially at the focus of said mirror, said mirror having an aperture therethrough, and a light sensitive element aligned with said aperture and responsive to the light reflected from the surface portions of the article facing towards said mirror and said aperture.

2. Inspection apparatus as defined in claim 1 in which adjusting members are interposed between said mirror and said housing for vertical and tilt adjustment of said mirror.

3. Inspection apparatus as defined in claim 1 in which said support has portions for continuously rotating said article and changing the surface portions facing towards said aperture.

4. Inspection apparatus as defined in claim 1 in which said mirror has a spherical surface.

5. Inspection apparatus as defined in claim 1 in which said mirror has a cylindrical surface.

6. Inspection apparatus as defined in claim 1 in which said mirror has a frusto-conical surface.

7. Inspection apparatus as defined in claim 1 in which said support comprises spaced fixedly supported parallel rails, and a rotating member below said rails and engaging said article for rotating the article.

8. Inspection apparatus as defined in claim 1 in which said support comprises spaced parallel rails and members are provided for rotating said rails in the same direction.

9. Inspection apparatus as defined in claim 1 in which said support comprises spaced tapered rails and members are provided for rotating said rails in the same direction.

10. Inspection apparatus as defined in claim 1 in which said support comprises spaced parallel rails, and a member is provided for moving an article along said rails in predetermined timed relation.

11. Inspection apparatus as defined in claim 1 in which said light sensitive element has members connected thereto for selecting articles in response to the energization of said light sensitive element.

12. Inspection apparatus for an article having a predetermined geometrical surface with a center of curvature comprising a housing having a light source therein, a mirror carried by said housing for receiving the light from said source, said mirror having a corresponding interior geometrical surfaces of larger radius of curvature than said article surface, a collimating device in said housing interposed between said mirror and said source for directing light rays from said source to said mirror, a rotatable device for an article in said housing interposed between said collimating device and said mirror and located to rotatably position the article with a center of curvature of said article substantially at the focus of said mirror, said mirror having an aperture therethrough, members for supplying an article to a preterminied location on said rotatable device below said aperture, and a light sensitive element aligned with said aperture and responsive to the light reflected from the surface portions of the article facing towards said mirror and said aperture.

13. Inspection apparatus as defined in claim 12 in which members are provided controlled by said light sensitive element for determining the place of delivery of the article, and said last members include a solenoid actuated from said light sensitive element.

14. Inspection apparatus as defined in claim 12 in which members are provided controlled by said light sensitive element for determining the place of delivery of the article, and said last members include a member responsive to predetermined change in the light reflected from an article to said light sensitive element during rotation of the article.

References Cited in the file of this patent

UNITED STATES PATENTS

| | | |
|---|---|---|
| 1,985,074 | Bauersfeld | Dec. 18, 1934 |
| 2,051,695 | Glacy | Aug. 18, 1936 |
| 2,190,935 | Cox | Feb. 20, 1940 |
| 2,246,501 | Bradner et al. | June 24, 1941 |
| 2,690,258 | Cox | Sept. 28, 1954 |
| 2,701,055 | Strom | Feb. 1, 1955 |
| 2,738,197 | Stevens | Mar. 13, 1956 |
| 2,881,919 | Bartlett | Apr. 14, 1959 |